United States Patent
Smith

(10) Patent No.: US 10,859,445 B2
(45) Date of Patent: Dec. 8, 2020

(54) TEMPERATURE SENSOR ASSEMBLY

(71) Applicant: William L. Smith, Brevard, NC (US)

(72) Inventor: William L. Smith, Brevard, NC (US)

( * ) Notice: Subject to any disclaimer, the term of this patent is extended or adjusted under 35 U.S.C. 154(b) by 342 days.

(21) Appl. No.: 15/651,025

(22) Filed: Jul. 17, 2017

(65) Prior Publication Data

US 2019/0017880 A1    Jan. 17, 2019

(51) Int. Cl.
| | |
|---|---|
| *G01K 7/18* | (2006.01) |
| *G01D 11/24* | (2006.01) |
| *G01K 1/08* | (2006.01) |
| *G01K 1/16* | (2006.01) |
| *G01K 1/14* | (2006.01) |

(52) U.S. Cl.
CPC ............. *G01K 7/18* (2013.01); *G01D 11/245* (2013.01); *G01K 1/08* (2013.01); *G01K 1/146* (2013.01); *G01K 1/16* (2013.01)

(58) Field of Classification Search
CPC ............ G01K 7/18; G01K 1/146; G01K 1/16; G01K 1/08; G01D 11/245
See application file for complete search history.

(56) References Cited

U.S. PATENT DOCUMENTS

| 4,749,415 A * | 6/1988 | Barton ............... G01K 7/06 |
| | | 136/230 |
| 5,918,292 A | 6/1999 | Smith |
| 6,298,739 B1 | 10/2001 | Smith |
| 6,543,304 B1 | 4/2003 | Smith |
| 6,923,082 B1 | 8/2005 | Smith |
| 2002/0039378 A1* | 4/2002 | Shibayama ............ G01K 13/02 |
| | | 374/148 |
| 2005/0058179 A1* | 3/2005 | Phipps ................. G01K 1/08 |
| | | 374/208 |
| 2005/0183522 A1 | 8/2005 | Smith |
| 2007/0195857 A1 | 8/2007 | Krishnamurthy et al. |

(Continued)

FOREIGN PATENT DOCUMENTS

| CN | 103959025 | 7/2014 |
| JP | 2006300649 | 11/2006 |
| WO | 2013028819 | 2/2013 |

OTHER PUBLICATIONS

European Office Action for EP 18183609.9 dated Jun. 19, 2020, 5 pgs.

(Continued)

*Primary Examiner* — Xin Y Zhong
(74) *Attorney, Agent, or Firm* — Womble Bond Dickinson (US) LLP

(57) ABSTRACT

A temperature sensor assembly is described that includes a sensor probe including a probe head and a probe shaft. At least a tip of the sensor probe includes a material with a thermal conductivity proportionality constant greater than stainless steel. A temperature sensor is positioned within the probe shaft adjacent to the tip. A nose piece is positioned on the probe shaft opposite the probe head. The nose piece includes a material with a thermal conductivity proportionality constant greater than stainless steel. The temperature sensor assembly also includes a collar positioned around the probe shaft between the probe head and the nose piece, the collar is capable of rotating relative to the probe shaft during installation of the sensor assembly.

17 Claims, 6 Drawing Sheets

(56) References Cited

U.S. PATENT DOCUMENTS

2008/0016946 A1* 1/2008 Thanigachalam ........................... G01N 27/4077
73/31.05
2012/0010845 A1* 1/2012 Bohan .................. G01K 15/007
702/130
2014/0269820 A1* 9/2014 Perrault .................. G01K 1/14
374/54
2016/0305827 A1 10/2016 Heil et al.

OTHER PUBLICATIONS

Canadian Office Action for CA 3009559, dated Apr. 24, 2020, 5 pgs.
Chinese Office Action for App. No. 201810780297.6, dated Jul. 15, 2020, 15 pgs.

* cited by examiner

TEMPERATURE SENSOR ASSEMBLY

FIELD OF THE DISCLOSURE

The present disclosure relates generally to sensor assemblies and, more particularly, to a temperature sensor assemblies for use on industrial machinery and transportation equipment, including locomotives or the like.

BACKGROUND

Heavy industrial equipment, such as industrial machinery and transportation equipment, including locomotives and train cars, benefit from the use of temperature sensing technology. Temperature sensing technology of various forms is used to monitor the temperature of bearings that support the wheels and axles of a train car. If the bearings on a train car's axles become overheated, the bearing's lubricants will degrade, and the bearing components may lock up, prohibiting rotation of one or more wheels. Having a wheel lock up may cause the train to derail, resulting in significant delay, and potentially causing property damage or injury.

Freight rail has traditionally used track-side monitoring systems to watch for overheating wheel bearings. Passenger rail equipment has moved to onboard temperature sensors instead, which communicate directly with other onboard monitoring and control systems. By having a sensor dedicated to monitoring the temperature of each bearing individually, train engineers can be provided with more accurate, focused information.

SUMMARY

In one embodiment, the present disclosure describes a sensor assembly comprising a sensor probe including a probe head and a probe shaft. The probe shaft extends from the probe head along an axis. At least a tip of the probe shaft comprises a material with a thermal conductivity proportionality constant greater than stainless steel. A temperature sensor is positioned within the probe shaft near the tip. A thermally conductive epoxy holds the temperature sensor within the probe shaft. A nose piece is positioned on the tip of the probe shaft opposite the probe head, the nose piece comprising a material with a thermal conductivity proportionality constant greater than stainless steel, the nose piece further comprising a least one groove formed in an exterior surface thereof. A collar is positioned around the probe shaft between the probe head and the nose piece. The collar is capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

Another embodiment of the present disclosure includes a sensor assembly comprising a sensor probe including a probe head and a probe shaft. The probe shaft extends from the probe head along an axis. At least a tip of the sensor probe comprises a material with a thermal conductivity proportionality constant greater than stainless steel. A temperature sensor is positioned within the probe shaft adjacent to the tip. A nose piece is positioned on the probe shaft opposite the probe head, the nose piece comprises a material with a thermal conductivity proportionality constant greater than stainless steel. A collar is positioned around the probe shaft between the probe head and the nose piece. The collar is capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

Yet another embodiment of the present disclosure includes a sensor assembly comprising a sensor probe including a probe head and a probe shaft. The probe shaft extends from the probe head along an axis. A temperature sensor is positioned within the probe shaft adjacent to a tip thereof. A nose piece is positioned on the tip of the probe shaft opposite the probe head. The nose piece comprises at least one groove on an exterior surface thereof. A collar is positioned around the probe shaft between the probe head and the nose piece. The collar is capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

These and other aspects of the present disclosure will become apparent to those skilled in the art after a reading of the following description of the preferred embodiment when considered with the drawings.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
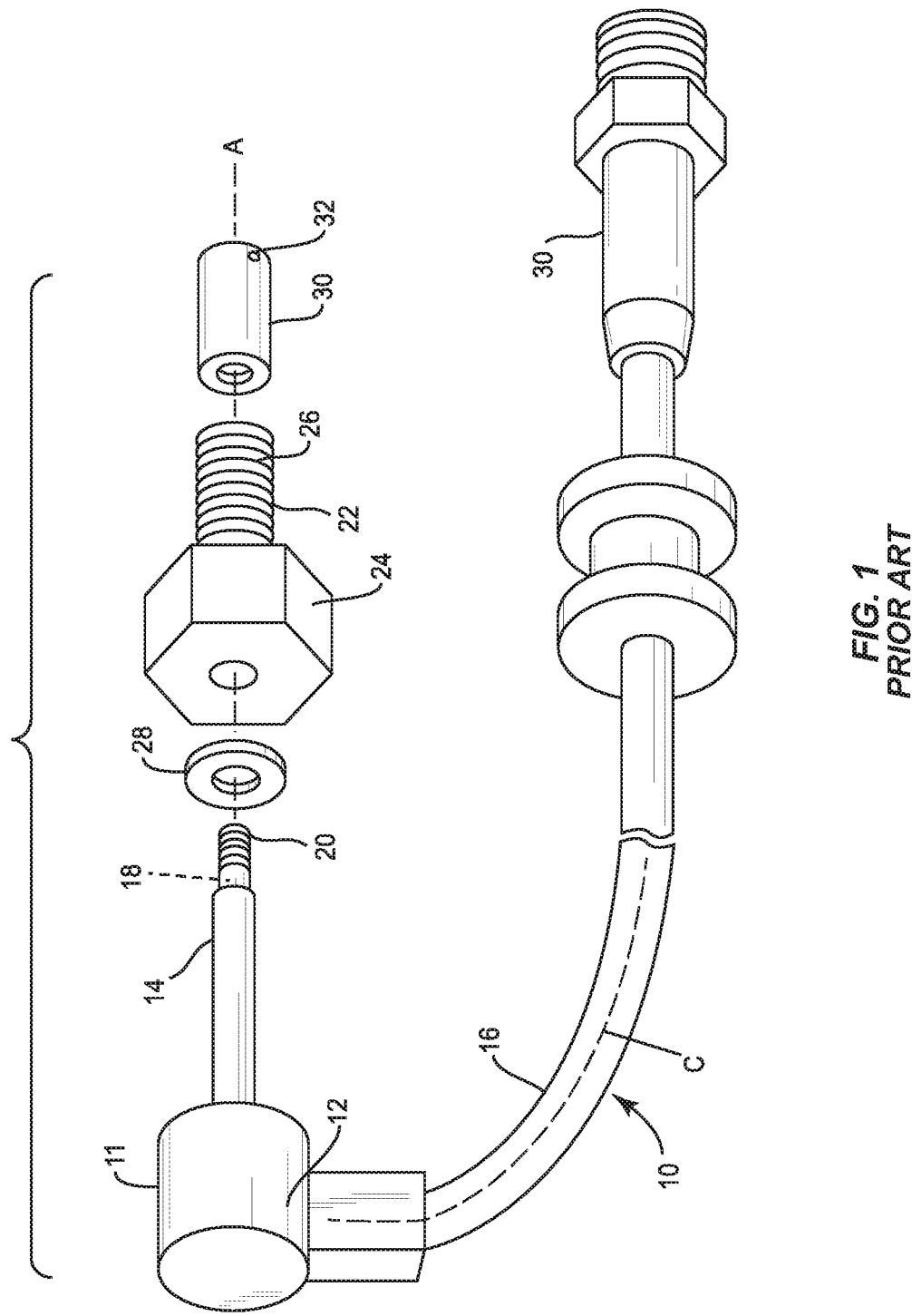
FIG. 1 is an exploded view of an existing sensor assembly.

Referring now to FIG. 1, an existing sensor assembly 10 according to the prior art is shown in an exploded form. The sensor assembly 10 includes a sensor probe 11 comprising a probe head 12 and a probe shaft 14. The probe shaft 14 extends from the probe head 12. The probe shaft 14 of existing sensor assemblies 10 are made from stainless steel. Stainless steel was generally considered an advantageous material due to its cost, manufacturability, reactivity, and resistance to rust, when considered for use under the harsh conditions found within the bearing housings of locomotives or under train cars generally. Threaded stainless steel parts also have the strength to receive significant torque during installation without stripping the threads. The probe head 12 can a rubber or thermoplastic sheath over-molded onto the end of the probe shaft 14 or other fabricated arrangement to protect the junction between the probe shaft and an exit cable 16.

Exiting the probe head 12 at a location away from the probe shaft 14, the exit cable 16 provides a connection from a temperature sensor 18, such as a thermistor, thermalcouple, or resistance temperature detector (RTD), packed within the probe shaft 14, to a measuring instrument, display, or control system. The temperature sensor 18 is a device that measures temperature directly or whose output may be converted to a specific or relative temperature reading. For example, a thermistor is monitored for a change in electrical resistance that results from a change in temperature of the thermistor. The resistance, resulting voltage, or change thereof, can be converted to a measure of the temperature at or near the thermistor. The probe shaft 14 has a longitudinal axis A and the exit cable 16 has a cable axis C. Because the longitudinal axis A is generally perpendicular to the cable axis C at the probe head 12, the sensor assembly 10 may be referred to as a right-angle sensor assembly. The present disclosure is not limited to right angle sensor assemblies but also contemplates other angles, including a generally collinear arrangement between the longitudinal axis A and the cable axis C (see FIG. 6).

Further describing the existing sensor assembly 10, the probe shaft 14 includes a threaded tip 20 at the distal end opposite the probe head 12. A collar 22 is positioned around the probe shaft 14. The collar 22 often includes a hexhead 24 and a threaded end 26. The hexhead 24 is engageable by a wrench when the collar 22 is being threaded into engagement at its installed sensing position. An example of an installed sensing position is an access port into a bearing housing of a train car axle. Rotation between the probe shaft 14 and the collar 22 allows the collar to be screwed into engagement at the sensing position while leaving the sensor probe 11 to be freely adjusted and positioned. Therefore, removal and re-installation of the sensor assembly 10 can be accomplished without twisting or disconnecting the exit cable 16. The exit cable 16 can be positioned at any angle around the 360° of rotation, which allows for the exit cable to be used in a variety of positions.

Also shown in FIG. 1, a seal 28 may be provided between the probe head 12 and the collar 22. The seal 28 can an O-ring, or be substantially flat, and has an aperture substantially equal to the diameter of the probe shaft 14 to allow the seal to be seated firmly between the collar 22 and the probe head 12. The seal 28 seals the gap between the probe head 12 and collar 22 to keep out elements such as water, dirt, or grease. Additionally, in the preferred embodiment, the seal 28 is substantially smooth, to allow rotation between the probe head 12 and collar 22. When the collar 22 is fixed at the sensing position, the probe head 12 can rotate to position the exit cable 16 while maintaining a seal between the probe head and the collar.

To complete assembly of the existing sensor assembly 10, a nose piece 30 is attached onto the threaded tip 20 of the probe shaft 14. The nose piece 30 retains the collar 22 and the seal 28 along the probe shaft 14. The nose piece 30 is provided with one or more apertures 32, which are configured to receive a tool to tighten the nose piece 30 onto the probe shaft 14. The nose piece 30 of the existing sensor assembly 10 is made from stainless steel. Again, stainless steel helps avoid stripping the threads therein when subject to high torque during initial assembly onto the probe shaft 14. When initially developed, stainless steel was the clear choice for the metal components of the existing sensor assembly 10 due to its combination of strength, hardness, durability, resistant to corrosion, low cost, and ease of manufacturability.

While the existing sensor assembly 10 shown in FIG. 1 has proven an effective design for many years, improvements are still possible. Particularly, it was determined that one or more factors could be influenced to increase response time of the temperature sensor assembly. The temperature sensor assembly could be improved by developing a structure that facilitated an increased rate of heat transfer so that the temperature at the sensor element more quickly approaches the temperature of the assembly's environment.

Figure 2:
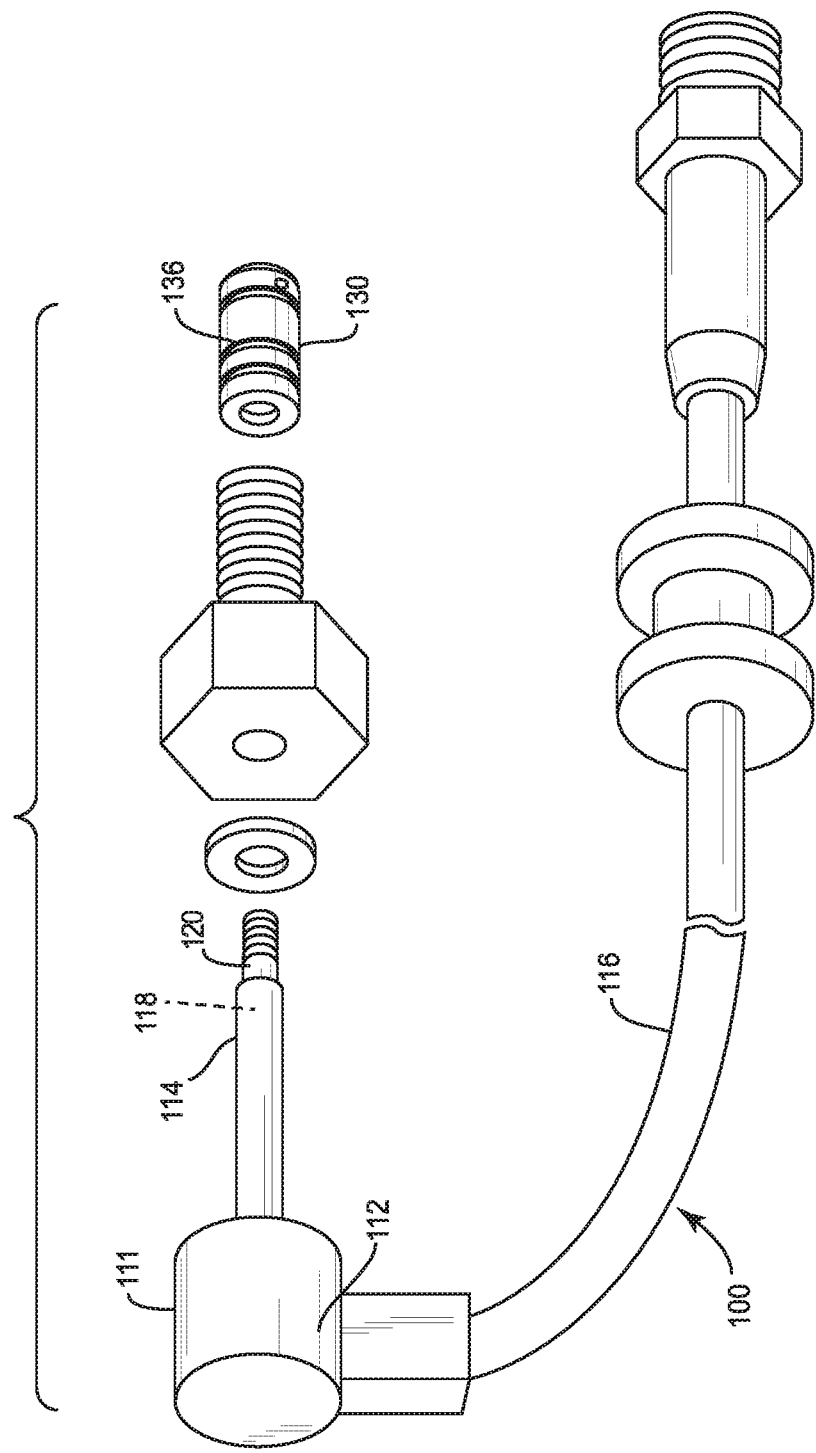
FIG. 2 is an exploded view of an improved sensor assembly constructed according to one embodiment of the present disclosure.
Figure 3:
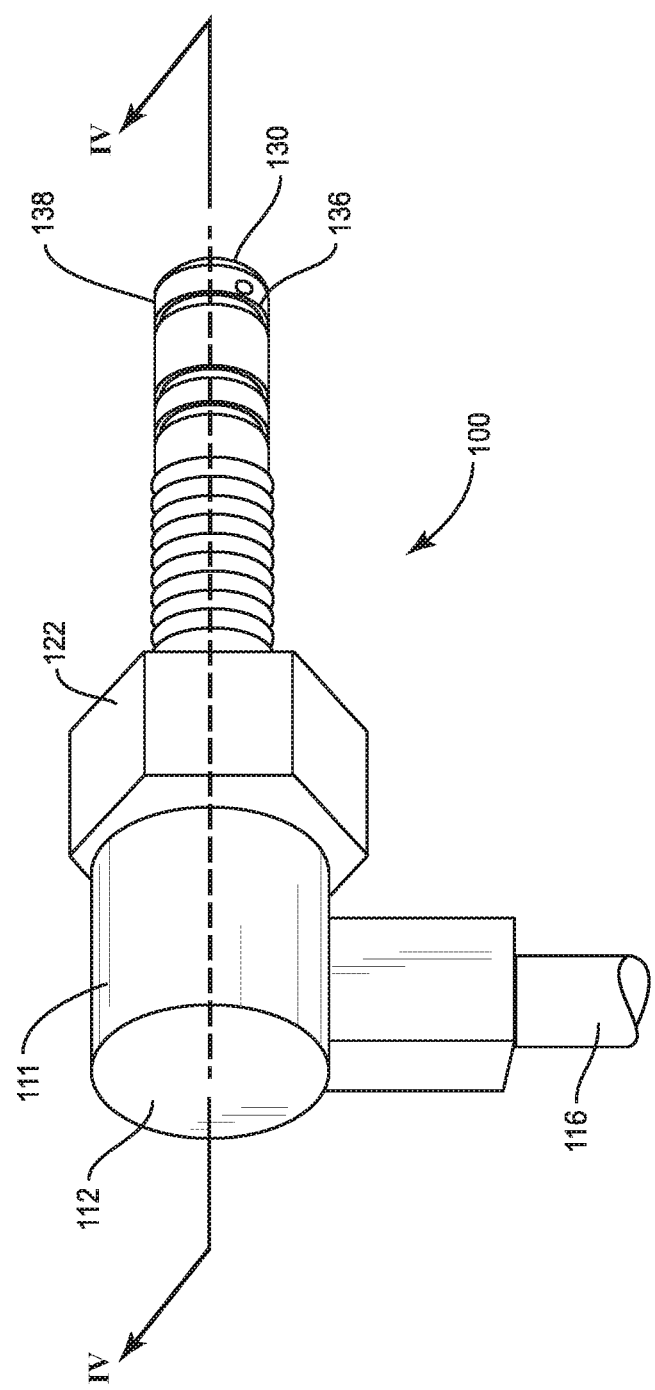
FIG. 3 is a perspective view of the sensor assembly shown in FIG. 2.
Figure 4:
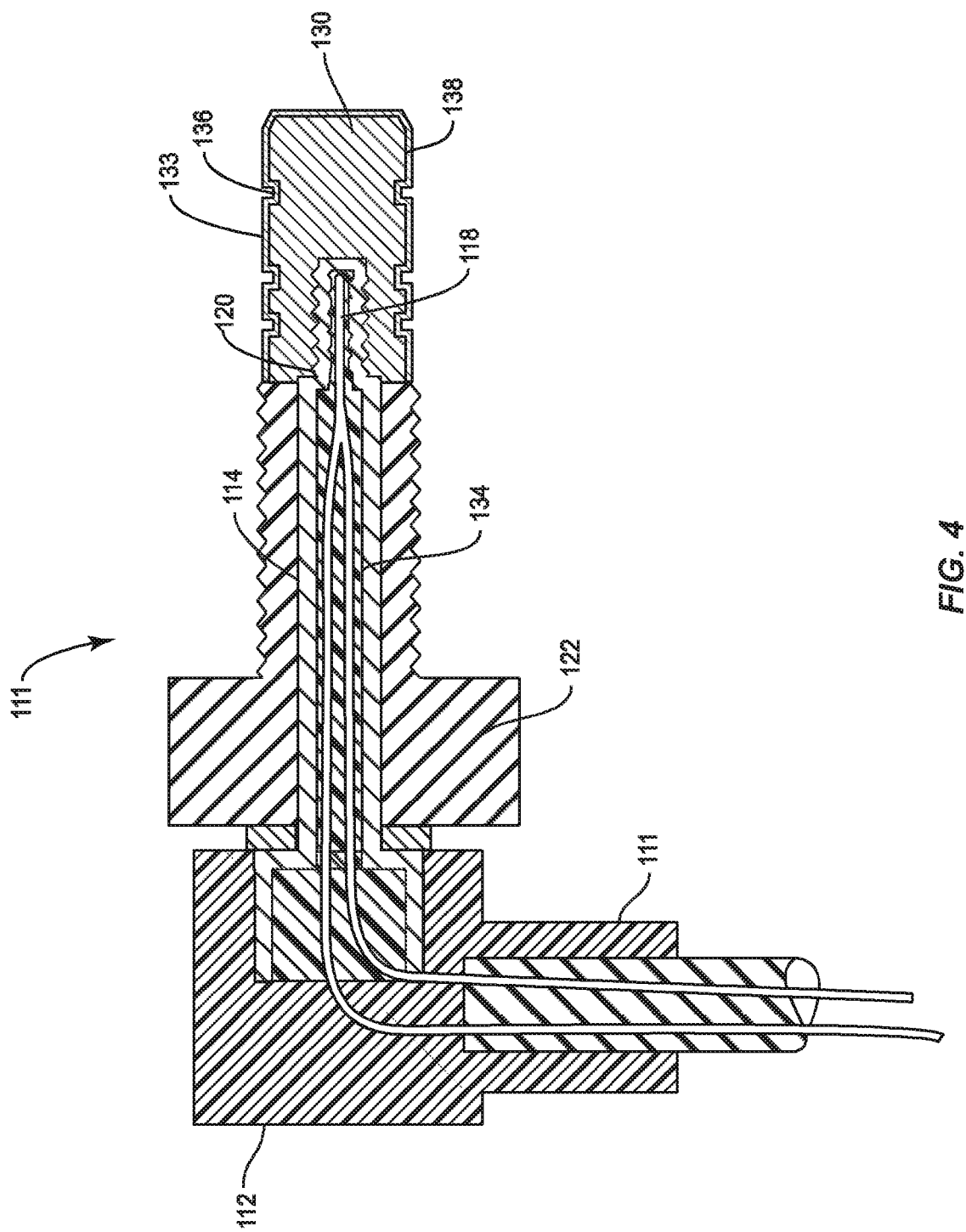
FIG. 4 is a longitudinal cross sectional view of the sensor assembly of FIG. 3 taken along line IV-IV.

Turning to FIGS. 2-4, an improved sensor assembly 100 is shown. First, at least a tip 120 of the probe shaft 114 of the sensor probe 111 is cast or otherwise manufactured from a material other than stainless steel, particularly a material having a thermal conductivity proportionality constant (k) greater than that of stainless steel, and preferably greater than thirty. The sensor probe 114 may be entirely formed from high thermal conductivity material or simply the tip 120. The tip 120 is adjacent to the temperature sensor 118 and therefore thermal conductivity at this location may be important. Having the remainder of the sensor probe 114 with a lower thermal conductivity may actually increase the rate of heat transfer from the environment to the temperature sensor 118 through the tip 120 by reducing the spread of heat energy from the tip 120 to the remainder of the sensor probe 114.

At room temperature, copper has a k value (measured in BTU/h*ft*° F.) exceeding two-hundred. Copper alloys, which provide increased strength and hardness compared to pure copper, such as brass, bronze, or other copper containing alloys, also include k values greater than stainless steel. The specific k value is dependent upon the percentage of copper in the alloy. For example, a brass with 70% copper and 30% Zinc may have a k value of approximately eighty-five. Brass may be a particularly suitable material for the tip 120 of the sensor probe 114. The increased thermal conductivity provided by copper and copper alloys allows the heat around the probe shaft 114 to easily and more quickly reach and affect the temperature sensor 118, e.g. a thermistor, thermal couple, or RTD. Conventional approaches had selected stainless steel over brass because brass is a softer metal and is more easily damaged by excess torque. For this reason, brass was not seriously considered previously, particularly because stainless steel was believed to provide sufficient performance.

Similarly, the nose piece 130 is preferably, but not necessarily, also made from a copper alloy such as brass, to further increase heat conductivity between the ambient environment and the temperature sensor 118. The nose piece 130 may be used to secure a collar 122 and a seal 128 around the probe shaft 114. To assist securement of the nose piece 130 to the probe shaft 114, apertures 132 may be provided to receive a tool. The nose piece 130 may have flats instead of apertures 132 to provide similar assistance when the nose piece 130 is screwed or pressed onto the tip 120 of the probe shaft 114 with a tool. The nose piece 130 should be attached to the tip 120 of the probe shaft 114 in a manner which minimizes the air gap between the nose piece and the tip. Thermal grease may be used between the nose piece 130 and the tip 120 to minimize any air gaps. The collar 122 and the seal 128 may be substantially similar to the collar 22 and the seal 28 found on the existing sensor assembly 10. The collar 122 is capable of rotating relative to the probe shaft 114 during installation of the sensor assembly 100 thus allowing the sensor assembly to be installed or removed from a mounting area without twisting an exit cable 116 extending from the sensor probe 111 or disconnecting the exit cable from the sensor probe. Preferably, the collar 122 remains fabricated from stainless steel because of the high torque applied when installing the sensor assembly 100. In at least one embodiment, the collar 122 may be omitted and the probe shaft 114 may be directly attached to a sensing location. Where the collar 122 is omitted, the nose piece 130 may be similarly omitted. A rubber or thermoplastic probe head 112 may be over-molded onto the end of the probe shaft 114 to protect the junction between the probe shaft and the exit cable 116 as both a seal against contaminants as well as a strain relief for the exit cable.

As seen in FIG. 4, the nose piece 130 may be provided with a thin cladding 133 of nickel. The cladding 133 can help limit corrosion of the nose piece 130 and provide a silver appearance similar to the stainless steel appearance of existing nose pieces 30. The thin cladding of nickel is not believed to have a significant impact on the thermal conductivity path from the ambient environment to the temperature sensor 118. Nickel does, however, have a k value of approximately thirty-six.

Also shown in FIG. 4, the probe shaft 114 is substantially hollow in order to house the temperature sensor 118. To secure the temperature sensor 118 within the probe shaft 114, a resin epoxy 134 is used. The epoxy 134 is selected for its high thermal conductivity. The epoxy 134 should fill in the probe shaft 114 in a manner that minimizes air gaps between the temperature sensor 118 and the probe shaft.

Figure 5:
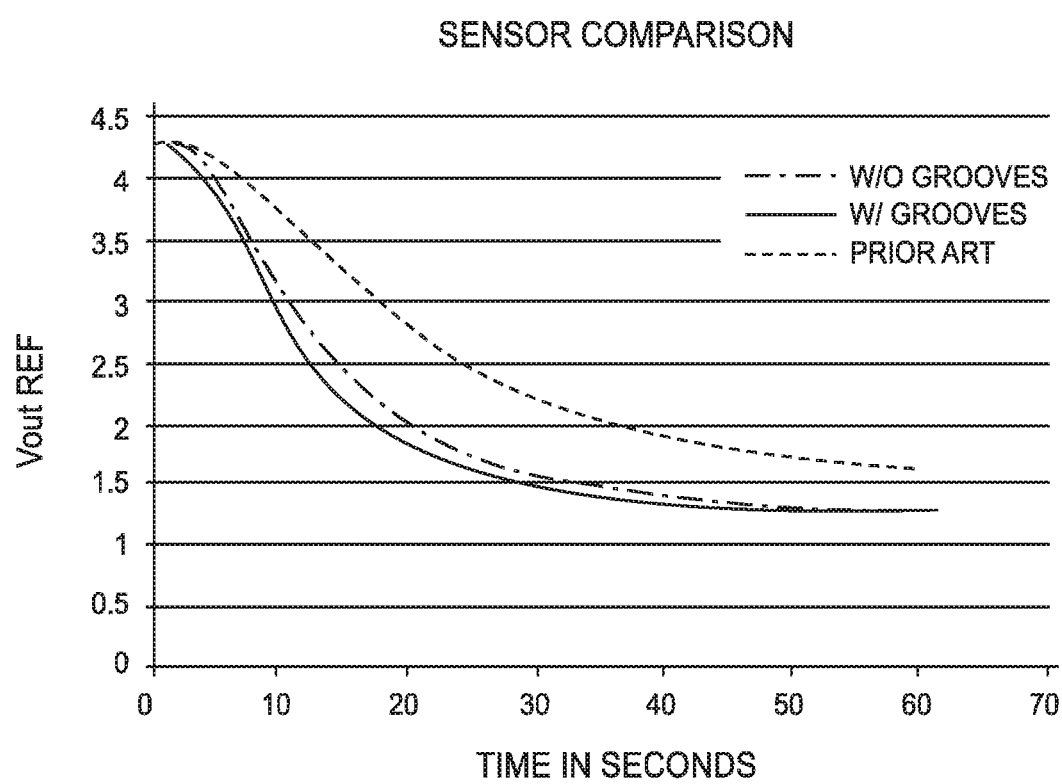
FIG. 5 is a chart comparing the response time of the existing sensor assembly with the response time of improved sensor assemblies according to embodiments of the present disclosure.

FIG. 5 shows the results of comparative testing between the existing sensor assembly 10 (see the dashed line) and an improved sensor assembly 100 as described above by altering some of the materials used to make the sensor assembly from stainless steel to brass (see the solid line). The comparative testing charts the sensor output in volts in relation to time since exposure to a 100° C. oil bath. Thus, the faster the voltage levels off, the faster the response time shown by the sensor assembly.

Returning to FIG. 2, another additional modification was made to the sensor assembly 100 compared to the existing sensor assembly 10. With this modification, the nose piece 130 was provided with a set of grooves 136 formed, e.g. machined, into the exterior surface 138 of the nose piece. In one embodiment, the grooves 136 are formed circumferentially around the nose piece 130. These grooves 136 have the effect of reducing the amount of material between the ambient environment and the temperature sensor 118. Machining the grooves 136 into the nose piece 130 has the added benefit of reducing the mass of the sensor assembly 100. These grooves 136 also increase the surface area of the nose piece 130 that is exposed to the ambient environment being monitored.

In one embodiment, the nose piece 130 is provided with three grooves 136, two located axially on one side of the aperture 132 and one groove located on the other side of the aperture. The grooves 136 may be square grooves with 90 degree corners and edges as shown, or may be machined into the nose piece 130 with rounded features. The grooves 136 may each extend circumferentially around the entire nose piece 130 or may extend around only a portion of the circumference. In another embodiment, the grooves 136 may be cut lengthwise along the nose piece 130. In one embodiment, the grooves 136 are cut 1/16 inches wide along the longitudinal axis A. The grooves 136 may be cut to a depth of 1/64 inch or up to approximately one-half of the wall thickness of the nose piece 130. As used herein, the term "grooves" includes other surface features that do not pass through the wall of the nose piece 130 which result in an increase in the area of the exterior surface 138, including but not limited to notches, threads, voids, indentations, channels, etc., that extend partially or fully around the circumference, parallel with the longitudinal axis A or with some angle in between.

The improved sensor assembly 100 with the grooves 136 in the nose piece 130, as illustrated, was also tested. The results from the sensor assembly with the grooves 136 are shown in FIG. 5 with a dash-dot line. As seen from FIG. 5, the addition of the grooves 136 even further improved the response time of the sensor assembly 100 compared to the existing sensor assembly 10. While the sensor assembly 100 has been described in terms of using grooves 136 on a brass based nose piece 130, other embodiments are envisioned where the nose piece 130 has grooves 136 or other surface features while being made from stainless steel.

As seen in FIG. 5, the improved sensor assemblies 100 showed a faster initiation time, i.e. the time before the temperature sensor 118 registered a change from initial temperature. The improved sensor assemblies 100 also displayed a faster overall response time, arriving at the true temperature equivalent voltage more quickly. During testing, both the improved sensor assembly 100 and the existing sensor assembly 10 were initially taken from room temperature and placed in an oil bath at one-hundred degrees centigrade. The temperature of the bath is equal to an output voltage of 1.4 volt in this experiment based upon the temperature sensor in use. While the improved sensor assemblies 100 reached the 1.4 volt level around 35 seconds, the existing sensor assembly 10 was still adjusting after 60 seconds. In fact, the average response time of the existing sensor assembly 10 was determined to be approximately 71 seconds (not shown), resulting in an approximate 50% improvement for the improved sensor assemblies 100.

Figure 6:
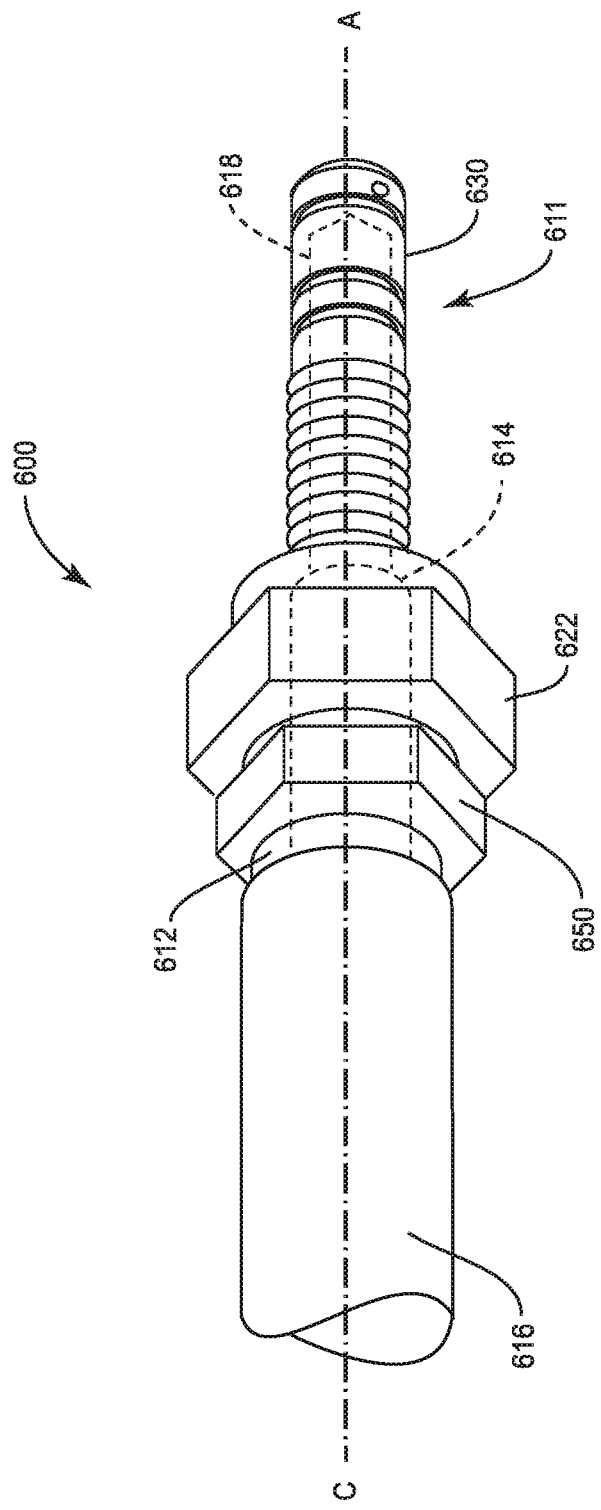
FIG. 6 is a sensor assembly according to a second embodiment of the present disclosure.

Turning to FIG. 6, an improved sensor assembly 600 according to a second embodiment is shown. The sensor assembly 600 includes a sensor probe 611, a probe head 612, a probe shaft 614, an exit cable 616, a temperature sensor 618, a collar 622, and a nose piece 630. Each of the elements of the sensor assembly 600 is substantially equivalent to the corresponding features and elements of the sensor assembly 100. The primary distinction is that the longitudinal axis A is substantially coaxial with the cable axis C. Additionally, a jamb nut 650 may be provided to prevent the collar 622 from vibrating loose in high shock applications.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:
1. A sensor assembly comprising:
a sensor probe including a probe head and a probe shaft, the probe shaft extending from the probe head along an axis, at least a tip of the probe shaft comprising a material with a thermal conductivity proportionality constant greater than stainless steel;

a temperature sensor positioned within the probe shaft near the tip;

a thermally conductive epoxy holding the temperature sensor within the probe shaft;

a nose piece positioned on the tip of the probe shaft opposite the probe head, the nose piece comprising a material with a thermal conductivity proportionality constant greater than stainless steel, the nose piece further comprising at least one groove formed in an exterior surface thereof, the nose piece including a cladding of material configured to limit corrosion of the nose piece, and a collar positioned around the probe shaft between the probe head and the nose piece, the collar capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

2. The sensor assembly of claim 1, wherein the at least one groove is a plurality of grooves which extend around a circumference of the nose piece.

3. The sensor assembly of claim 1, wherein the thermal conductivity proportionality constant of at least the tip of the sensor probe and the nose piece is greater than thirty.

4. The sensor assembly of claim 3, wherein at least the tip of the sensor probe and the nose piece each comprise brass.

5. The sensor assembly of claim 1, wherein the collar comprises stainless steel.

6. A sensor assembly comprising:

a sensor probe including a probe head and a probe shaft, the probe shaft extending from the probe head along an axis, wherein at least a tip of the sensor probe comprises a material with a thermal conductivity proportionality constant greater than stainless steel;

a temperature sensor positioned within the probe shaft adjacent to the tip;

a nose piece positioned on the probe shaft opposite the probe head, the nose piece comprising a material with a thermal conductivity proportionality constant greater than stainless steel;

a nickel cladding applied to an exterior surface of the nose piece; and a collar positioned around the probe shaft between the probe head and the nose piece, the collar capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

7. The sensor assembly of claim 6, wherein the thermal conductivity proportionality constant of at least the tip of the sensor probe and the nose piece is greater than thirty.

8. The sensor assembly of claim 7, wherein at least the tip of the sensor probe and the nose piece each comprise brass.

9. The sensor assembly of claim 6, wherein the collar comprises stainless steel.

10. The sensor assembly of claim 6, wherein the nose piece comprises at least one groove formed in an exterior surface thereof.

11. The sensor assembly of claim 10, wherein the at least one groove comprises a plurality of grooves that extend around a circumference of the nose piece.

12. The sensor assembly of claim 6, wherein the nose piece is configured to be exposed to a corrosive environment.

13. A sensor assembly comprising:

a sensor probe including a probe head and a probe shaft, the probe shaft extending from the probe head along an axis;

a temperature sensor positioned within the probe shaft adjacent to a tip thereof;

a nose piece positioned on the tip of the probe shaft opposite the probe head, the nose piece comprising at least one groove in an exterior surface thereof, each groove of the at least one groove extending about the entire circumference of the nose piece, the nose piece comprising a material with a thermal conductivity proportionality constant greater than stainless steel;

a nickel cladding applied to the exterior surface of the nose piece; and a collar positioned around the probe shaft between the probe head and the nose piece, the collar capable of rotating relative to the probe shaft during installation of the sensor assembly, thus allowing the sensor assembly to be installed or removed from a mounting area without twisting a cable extending from the sensor probe or disconnecting the cable from the sensor probe, a mating cable, or a junction box.

14. The sensor assembly of claim 13, wherein the nose piece comprises brass.

15. The sensor assembly of claim 13, wherein the at least one groove comprises a plurality of grooves that extend around a circumference of the nose piece.

16. The sensor assembly of claim 13, wherein at least the tip of the sensor probe comprises a material with a thermal conductivity proportionality constant greater than stainless steel.

17. The sensor assembly of claim 16, wherein at least the tip of the sensor probe comprises brass.

* * * * *